Dec. 14, 1926.  
S. G. LINDEQUIST  
1,610,868  
INTERNAL COMBUSTION OR EXPLOSION FOUR-STROKE CYCLE ENGINE  
Filed May 12, 1923
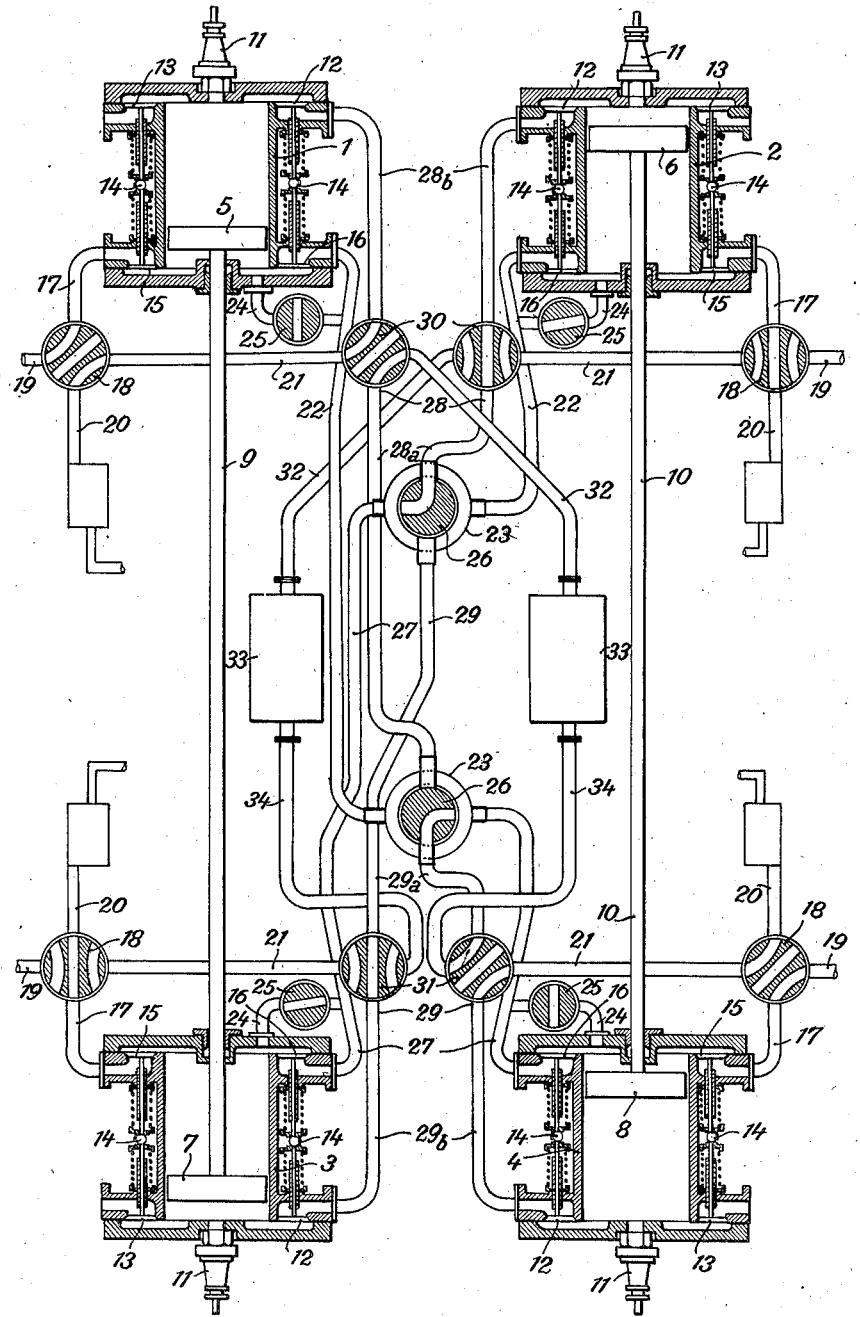
Inventor:  
Sven Gustaf Lindequist Patented Dec. 14, 1926.

1,610,868

UNITED STATES PATENT OFFICE.

SVEN GUSTAF LINDEQUIST, OF BERLIN, GERMANY.

INTERNAL COMBUSTION OR EXPLOSION FOUR-STROKE-CYCLE ENGINE.

Application filed May 12, 1923, Serial No. 638,503, and in Germany November 24, 1922.

This invention relates to an internal combustion- or explosion four stroke cycle engine in which the compressed air or a compressed mixture of gas and air is supplied to the working space of the cylinder.

Separate compressors or crank case compressors have been used hitherto for compressing the scavenging air and the air for combustion wherefrom results however an increase of weight of the total aggregrate. The pressures which can be produced with these compressors are however not sufficient to supply to the engine a sufficient quantity of compressed gas if the engine is working at high speed and if consequently the velocity of flow in the gas conduits is great, wherefrom results for instance that the number of revolutions of the engine and the efficiency of the same could not be increased to the desired degree.

According to this invention these inconveniences are avoided by using the space of the working cylinder which is closed at both ends as compressor chamber which is connected with the working space of the same cylinder or of another cylinder so that the compressed air produced in the compressor chamber of the engine cylinder can get directly into the corresponding working space. By this arrangement any loss from separation is avoided, such loss occurring always with the compressors of known type. As the efficiency of the compressor according to the invention increases with the number of revolutions of the engine a constant compression is ensured at all speeds. The mixture is well heated preliminarily as the compression is effected in the engine cylinder so that it is possible to use heavy fuels and oils which could not be used hitherto. On the other hand the cylinder is well cooled by the mixture which is sucked in if the second end of the cylinder is used as compressor, this being of considerable advantage, specially for high-speed engines working with overcharge.

An adjustable return connection is preferably arranged between the connecting pipe, shut off from the compressor space and from the working space by means of valves, and the compressor space, this return connection consisting of a second pipe, the cross section of passage of which may be throttled more or less by means of the regulating element.

If there are several cylinders in one engine two of these cylinders could further be connected the one with the other by means of pipes leading across a multiple way cock in such a manner that the two compressor spaces communicate always with one of the working spaces. At this working method as well as in the case that the compression space of an engine cylinder works together with its own working space a quantity of compression air, equal to the double volume of the cylinder will be always at disposal for each working stroke of the four stroke cycle engine. At the working method according to which two compressor spaces communicate with one working space it is not necessary to accumulate one of the cylinder charges, as must be done if the compression space works together only with its own working space, as charges of compression air from both cylinders are directly transferred to the working cylinder after they have been produced. The reductions of pressure due to the accumulation, which have a detrimental reaction on the engine, are thus avoided.

Reversing valves may be inserted in the suction piping and in the pressure piping for the compressor and auxiliary pipings may be arranged in the engine in such a manner that, according to the position of the valves, the suction pipe from the carburettor is connected with the suction pipe of the compressor and the pressure pipe of the compressor with the supply pipe for the working space, or the atmosphere is connected with the suction pipe of the compressor, the suction pipe of the carburettor with the supply pipe of the working space and the pressure pipe of the compressor with a reservoir for compressed air. With this object in view the case of one of the valves which are constructed like four-way cocks, may be connected with the suction pipe of the compressor, the atmosphere, the suction pipe of the carburettor and a by-pass pipe leading to the second valve, the case of the second valve being however connected with the by-pass pipe, the supply pipe for the working space, the reservoir for the compressed air and the pressure pipe of the compressor.

With a construction of this type it is possible to let the engine work temporarily as sucking in engine that is to say without compressed mixture, and to use the compressor side of the engine during this time for the production of compressed air which may be utilized at subsequent working periods for the engine itself or generally for other auxiliary purposes.

The arrangement according to the invention serves principally to increase the presence of the gas mixture to be admitted to the working cylinder only for increasing the velocity of the gas or for reducing the size of the valves or the stroke of the valves without increase of the average explosion pressure in the working cylinder beyond the normal height. The invention supplies thus a means to attain in a simple manner numbers of revolutions which up to the present could never be attained.

An embodiment of the invention is shown by way of example on the accompanying drawing which illustrates diagrammatically the construction and gear of a four-cylinder engine.

In the cylinders 1, 2, 3, 4 the working pistons 5, 6, 7, 8 are arranged as usual. Every two pistons, in the form of construction shown the pistons 5 and 7 and the pistons 6 and 8, are rigidly connected the one with the other by piston rods 9, 10. The piston rods are shown on the drawing at an exaggerated length in order to make the diagrammatical illustration clearer. With each piston rod a connecting rod is connected, which is not shown in the drawing, and designed to translate the reciprocating motion into a rotating motion by acting upon a crank shaft.

The working space of the cylinders has, as usual, a sparking plug 11, an inlet valve 12 and an outlet valve 13, said valves being controlled in the well known manner by means of cam shafts 14.

The other side of the cylinder is closed also and the piston rod is guided by a stuffing box. This other end of the cylinder has an inlet or suction valve 15 and an outlet or pressure valve 16. These valves may be constructed as non-return valves if the engine has to work at slow speed, or for high-speed engines they may be controlled by cam shafts, for instance by the cam shafts 14. These valves must be controlled evidently by other cams than the valves for the working cylinder. The construction of such cams being well known they have been indicated on the drawing only diagrammatically. From the compressor space a suction pipe 17 leads across the suction valve 15 to the four-way reversing valve 18. The case of the four-way reversing valve is connected with the pipe 19 communicating with the atmosphere, the suction pipe 20 of the carburettor and a fourth pipe 21 which is connected on the other hand with a second reversing valve which will be hereinafter described.

From the compressor space a pressure pipe 22 conducts across the pressure valve 16 to a case 23 and this pressure pipe 22 is connected by an auxiliary pipe 24 with the compressor space. In the auxiliary pipe 24 a valve 25 is inserted which is designed either to shut off the auxiliary pipe 24 completely or to throttle the same more or less.

With the case 23 a pipe 27 is further connected which leads to the compressor space of the second cylinder which works together with the cylinder 1, viz if cylinder 2 is considered to be the one described first, to the compressor space of the cylinder 3.

In the case 23 a multiple-way cock is arranged by means of which this case is either connected with the pipe 28 leading to the working space of the cylinder 2, as is shown on the drawing, or with the pipe 29 which leads to the working space of the cylinder 3.

If the multiple-way cock 26 is in the position shown on the drawing the mixture compressed in the cylinders 2 and 3 is conducted into the working space of the cylinder 2. If however the multiple-way cock 26 is rotated in counter-clockwise direction of 90° the reservoir is made to communicate with pipe 29 so that the mixture compressed in the two cylinders is conducted into the working space of the cylinder 3. Four-way cocks 30 and 31 are inserted in the pipes 28 and 29. If the four-way cocks are in the position shown on the drawing the passage through the pipes 28 and 29 is free. If these four-way cocks are however rotated of 45°, as shown in the pipes belonging to the cylinders 1 and 4, the plugs of the same interrupt the connection between the parts $28^a$ and $28^b$ respectively $29^a$ and $29^b$ of the pipes 28 and 29, but they establish the connection between the supply pipe $28^b$ of the working cylinder and the intermediate pipe 21 and the pressure pipe $28^a$ with a pipe 32 conducting to a reservoir 33 for compressed air. In a similar manner the cock plug 31 connects the supply pipe $29^b$ of the working cylinder with the intermediate pipe 21 and the pressure pipe $29^a$ with a pipe 34 for compressed air which leads to the air reservoir 33.

Simultaneously with the cock plugs 30, 31 the corresponding cock plugs 18 for the cylinders 1 and 3 have been rotated of 45° so that these cock plugs connect now the suction pipe 17 with the pipe 19 communicating with the atmosphere and the intermediate or by-pass tube 21 with the suction pipe 20 of the carburettor.

In order to ensure the simultaneousness of the reversing the valves 18, 30 and 31 belonging to one pair of cylinders, for instance to the cylinders 1 and 4 and 2 and 3 respectively are connected with the common control mechanism so that their position is simultaneously altered by the operation of this control mechanism. The valves 25 of each pair of cylinders may be connected with a common control mechanism in a similar manner.

While the valves 18, 25, 30 and 31 are operated by hand the valves 26 are operated automatically from the engine, for instance through the intermediary of the cam shaft, in such a manner that at the working stroke of one of the cylinders the compression spaces of the cylinders of one pair of cylinders are connected with the working space of the corresponding cylinder. The operation of the device is as follows: Suppose that in the working space of the cylinder 3 the air be compressed so that the explosion stroke begins. At this explosion stroke the piston 7 compresses the mixture which has been sucked in by the suction pipe 20 of the carburettor and by the pipe 17 through the suction valve 15 and the cylinder forces this mixture through the pressure valve 16 into the pipe 27 and through this pipe into the case 23. From this case 23 the mixture flows into the channel of the cock plug 26 and from there through the pipe 28 and through the inlet valve 12 into the working space of the cylinder 2. At the same time, with the piston 7 of the cylinder 3 at the suction stroke, piston 6 of the cylinder 2 has been moved downward by the crank shaft which is not shown so that this piston compresses also the mixture in front of it and forces the same to flow through the pressure valve 16 into the pipe 22 and from this pipe into the case 23 through the cock plug 26 and through the pipe 28 into the working space of the cylinder 2.

At the position of the valves 25 of the cylinders 2 and 3 as shown on the drawing, part of the mixture of gas and air flows back into the cylinders at the succeeding suction stroke so that in the pipes 28 and 29 does not exist the full pressure which would be produced if the valves 25 were closed. After the piston 7 has completed the explosion stroke and the piston 6 the suction stroke the valves 26 are reversed automatically so that they connect the compression spaces of the two cylinders 2, 3 with the working space of the cylinder 3.

At the back movement of the pistons 6 and 7 the burnt gases in cylinder 3 are scavenged and in cylinder 2 the fresh gases are compressed. Into both compression spaces a fresh mixture of gas and air is however sucked in through the suction valves 15. At the succeeding stroke the fresh mixture is forced into the working space of cylinder 3 while in cylinder 2 the explosion takes place. In the compression spaces of the two cylinders the previously sucked in mixture of gas and air is compressed and transmitted, as already mentioned, to the cylinder 3. At the position of the valves shown with regard to the cylinders 1 and 4, the cylinders suck, at the suction stroke, the gas and air mixture in directly from the carburettor through the pipes $28^b$, 21 and 20, the compression spaces drawing in fresh air directly from the atmosphere through the pipes 19 and 17. The air compressed in the compression spaces is transmitted to the reservoir 33 through the pipes 22 across the case 23, through pipe $29^a$ and pipe 34 or from cylinder 3 through the pipe 27, pipe $29^a$ and pipe 34, said air being accumulated in the reservoir 33 for any desired purposes.

In one and the same engine, instead of four cylinders, eight cylinders or any multiple number of four cylinders could be used. As stated above the increase of pressure of the mixture of gas and air produced by the arrangement according to the invention has to serve essentially to ensure the required speed at a high number of revolutions and to enable that owing to the increase of the velocity of the gas the dimensions of the valves and the stroke of the valves may be reduced. This reduction of the dimensions of the valves serves to make it possible to increase again the number of revolutions. Only in the second place the compressor serves to increase occasionally the average explosion pressure in the working cylinder.

In order to ensure a perfect working of the compressor the controlling means, e. g. the cams, for the outlet valve of the compressor and for the inlet valve of the working cylinder, are adjusted with regard to one another and in consideration of the different lengths of the pipes of the several cylinders which conduct the mixture between the compressor outlet and the working cylinder inlet and in consideration of the different resistances in these pipes, in such a manner that the points of the pulsations of pressure in the pipes reach always the working cylinder at the moment, when the inlet valve of the working cylinder is being opened. The height of pressure must evidently correspond with the over-pressure which still exists in the working cylinder. This height of pressure is regulated, as stated above, by adjusting the by-pass valve 25. In order to influence by this adjusting of the by-pass valve as little as possible the pulsations of pressure and the propagation of the same care has to be taken that the back flow of the mixture of gas and air takes place from the pressure channel into the compressor as much as possible at the beginning of the pressure channel. With this object in view the return channel 24 could fit into the pressure channel 22 near the beginning of the same or, in order to produce a back-flow, the outlet valve of the compressor would not be completely closed, the width of the gap which remains at the extreme closing position of the pressure valve being regulated in accordance with the backflow desired.

I claim:—

1. In an internal combustion engine, a cylinder closed at both ends, a piston in said cylinder, the space at one end of said piston serving as combustion chamber and the space at the other end of said piston serving as compression chamber, a passage connecting said chambers, and a by-pass between said compression chamber and said passage operable as pressure releasing means for said passage on the return stroke of said piston.

2. In an internal combustion engine, a cylinder closed at both ends, a piston in said cylinder, the space at one end of said piston serving as combustion chamber and the space at the other end of said piston serving as compression chamber, a passage connecting said chambers, a by-pass between said compression chamber and said passage operable as pressure releasing means for said passage on the return stroke of said piston, and a control valve in said by-pass.

3. In an internal combustion engine, a plurality of closed cylinders, a piston in each cylinder, the space at one end of a piston serving as combustion chamber and the space at the other end of said piston serving as compression chamber, and means for putting the combustion chamber of one of said cylinders in communication with the compression chambers of a plurality of said cylinders.

4. In a four cycle internal combustion engine, a plurality of closed cylinders, a piston in each cylinder, the space at one end of a piston serving as combustion chamber and the space at the other end of said piston serving as compression chamber, and means for putting the combustion chamber of one of said cylinders in communication with the compression chambers of a plurality of said cylinders.

5. In an internal combustion engine, a plurality of closed cylinders, a piston in each cylinder, the space at one end of a piston serving as combustion chamber and the space at the other end of said piston serving as compression chamber, and external pipes connecting the combustion chamber of one of said cylinders, without the intervention of a reservoir, with the compression chambers of a plurality of said cylinders.

6. In an internal combustion engine, a plurality of closed cylinders, a piston in each cylinder, the space at one end of a piston serving as combustion chamber and the space at the other end of said piston serving as compression chamber, communicating means between the combustion chamber of one cylinder and the compression chambers of a plurality of said cylinders, and a by-pass between said communicating means and a compression chamber.

7. In an internal combustion engine, a plurality of closed cylinders, a piston in each cylinder, the space at one end of a piston serving as combustion chamber and the space at the other end of said piston serving as compression chamber, communicating means between the combustion chamber of one cylinder and the compression chambers of a plurality of said cylinders, a by-pass between said communicating means and a compression chamber, and a control valve in said by-pass.

8. In an internal combustion engine, a plurality of closed cylinders arranged in coacting groups of two opposed cylinders, a piston in each of said cylinders, the space at one end of a piston serving as combustion chamber and the space at the other end of said piston serving as compression chamber, and means for putting in communication the compression chambers of the cylinders of one of said groups with the combustion chamber of one of the cylinders of the same group.

9. In an internal combustion engine, a plurality of closed cylinders arranged in coacting groups of two opposed cylinders, a piston in each of said cylinders, the space at one end of a piston serving as combustion chamber and the space at the other end of said piston serving as compression chamber, and connecting pipes between the combustion chambers and the compression chambers of the cylinders of a group, whereby the two compression chambers of a group are adapted to communicate with one of the combustion chambers of the same group.

10. In an internal combustion engine, a plurality of closed cylinders arranged in coacting groups of two, a piston in each of said cylinders, the space at one end of a piston serving as combustion chamber and the space at the other end of said piston serving as compression chamber, connecting pipes between the combustion chambers and the compression chambers of the cylinders of a group, and a multiway cock common to said connecting pipes for connecting the two combustion chambers with one of the said compression chambers.

11. An internal combustion engine comprising in combination several cylinders arranged in pairs each cylinder being closed at both ends, a piston in each cylinder and dividing said cylinder into a compression space and a working space, a reservoir for compressed air, a supply pipe for the working space, a compression suction pipe and a pressure pipe for each cylinder, auxiliary pipes for connecting said suction and compression pipes of the cylinders of one group, a reversing valve in each of said pipes, a suction pipe for the carburettor, and a suction pipe connecting with the atmosphere connected with each reversing valve so that, according to the position of said reversing valves, the suction pipe of the carburettor communicates with suction pipe of the compressor and the pressure pipe with the supply pipe for the working space or the atmosphere with the suction pipe of the compressor, the suction pipe of the carburettor with the supply pipe of the working space and the pressure pipe with said reservoir for compressed air.

12. An internal combustion engine comprising in combination several cylinders connected in pairs each cylinder being closed at both ends, a piston in each cylinder dividing said cylinder into a working space and a compression space, a carburettor for each cylinder, a reservoir for compressed air for each group of two cylinders, two four-way cocks for each cylinder, a case for each four-way cock, a compressor suction pipe connecting the compression space of the cylinder with one of said four-way cock cases, a pipe connecting the cases for the two four-way cocks, a supply pipe connecting the other case with the working space of the cylinder, a pipe connecting said second case with said reservoir, a pressure pipe of the compressor space of the cylinder and auxiliary pipes connecting said pressure pipe with said second case.

13. In an internal combustion engine, a plurality of closed cylinders, a piston in each cylinder, the space at one end of the piston serving as combustion chamber, and the space at the other end of the piston serving as compression chamber, a pipe connecting the combustion chamber of one cylinder with the compression chamber of another cylinder, means for introducing a gas into said connected compression chamber, and means for increasing the pressure of the gas delivered from said connected compression chamber only for the purpose of increasing the velocity of the gas in said pipe, whereby a reduction in the size of the valves and in the extent of the valve stroke is permitted, the explosion force in said connected combustion chamber not being increased beyond normal.

14. In an internal combustion engine, a plurality of closed cylinders, a piston in each cylinder, the space at one end of a piston serving as combustion chamber, and the space at the other end of said piston serving as compression chamber, a pipe connecting the combustion chamber of one cylinder with the compression chamber of another cylinder, an outlet valve for said compression chamber and an inlet valve for said combustion chamber, said valves being timed in accordance with the length of pipe between said chambers and the resistance to flow in said pipe so tnat a pressure pulsation travelling in said pipe from said outlet valve to said inlet valve reaches the latter at the instant it is opened, and means for regulating the degree of pressure in accordance with the over-pressure existing in said combustion chamber.

15. In an internal combustion engine, a plurality of closed cylinders, a piston in each cylinder, the space at one end of a piston serving as combustion chamber, and the space at the other end of said piston serving as compression chamber, a connecting pipe between the compression chamber of one cylinder and the combustion chamber of another cylinder, a return pipe between said connecting pipe and said compression chamber, and means for regulating the back flow from said connecting pipe into said compression chamber, said return pipe joining said connecting pipe at a point near said compression chamber for the purpose of avoiding disturbance of the regular development of pressure pulsations due to the operation of said regulating means.

In testimony whereof I affix my signature.

SVEN GUSTAF LINDEQUIST.